United States Patent [19]

Moe

[11] 3,859,230

[45] Jan. 7, 1975

[54] SYNTHESIS GAS GENERATION WITH CARBON DIOXIDE SUPPLEMENTED FEED

[75] Inventor: James M. Moe, Manhattan Beach, Calif.

[73] Assignee: Fluor Corporation, Los Angeles, Calif.

[22] Filed: Jan. 15, 1973

[21] Appl. No.: 323,853

Related U.S. Application Data

[63] Continuation-in-part of Ser. No. 869,051, Oct. 24, 1969, abandoned.

[52] U.S. Cl. ............................................. 252/373
[51] Int. Cl. ....... C01g 1/02, C01g 1/20, C01g 35/00
[58] Field of Search ....... 258/373; 48/213, 214, 196

[56] References Cited
UNITED STATES PATENTS

| | | | |
|---|---|---|---|
| 2,486,879 | 11/1949 | Rees et al. | 252/373 |
| 2,622,089 | 12/1952 | Mayland | 252/373 |
| 3,091,593 | 5/1963 | Jean et al. | 252/323 |
| 3,132,010 | 5/1964 | Dwyer et al. | 252/373 |
| 3,420,642 | 1/1969 | Percival | 252/373 X |
| 3,441,395 | 4/1969 | Mayland | 252/373 X |
| 3,467,506 | 9/1969 | Roche | 252/373 X |

FOREIGN PATENTS OR APPLICATIONS

| | | | |
|---|---|---|---|
| 1,580,390 | 7/1969 | France | 252/373 |

*Primary Examiner*—Howard T. Mars
*Attorney, Agent, or Firm*—H. Calvin White

[57] ABSTRACT

Synthesis gas is derived from a mixture of naphtha and steam by passing the mixture through a first reforming zone to produce an effluent mixture containing methane, steam, hydrogen and carbon dioxide, dividing said effluent mixture into a major portion and a minor portion, passing the major effluent portion to a second reforming zone for conversion to a synthesis gas product comprising hydrogen and carbon monoxide; separating carbon dioxide from the minor effluent portion, and passing the separated carbon dioxide to the second reforming zone to supplement the carbon dioxide content of the effluent major portion, to thereby increase the carbon monoxide content of the syntheses gas product relative to hydrogen.

1 Claim, 2 Drawing Figures

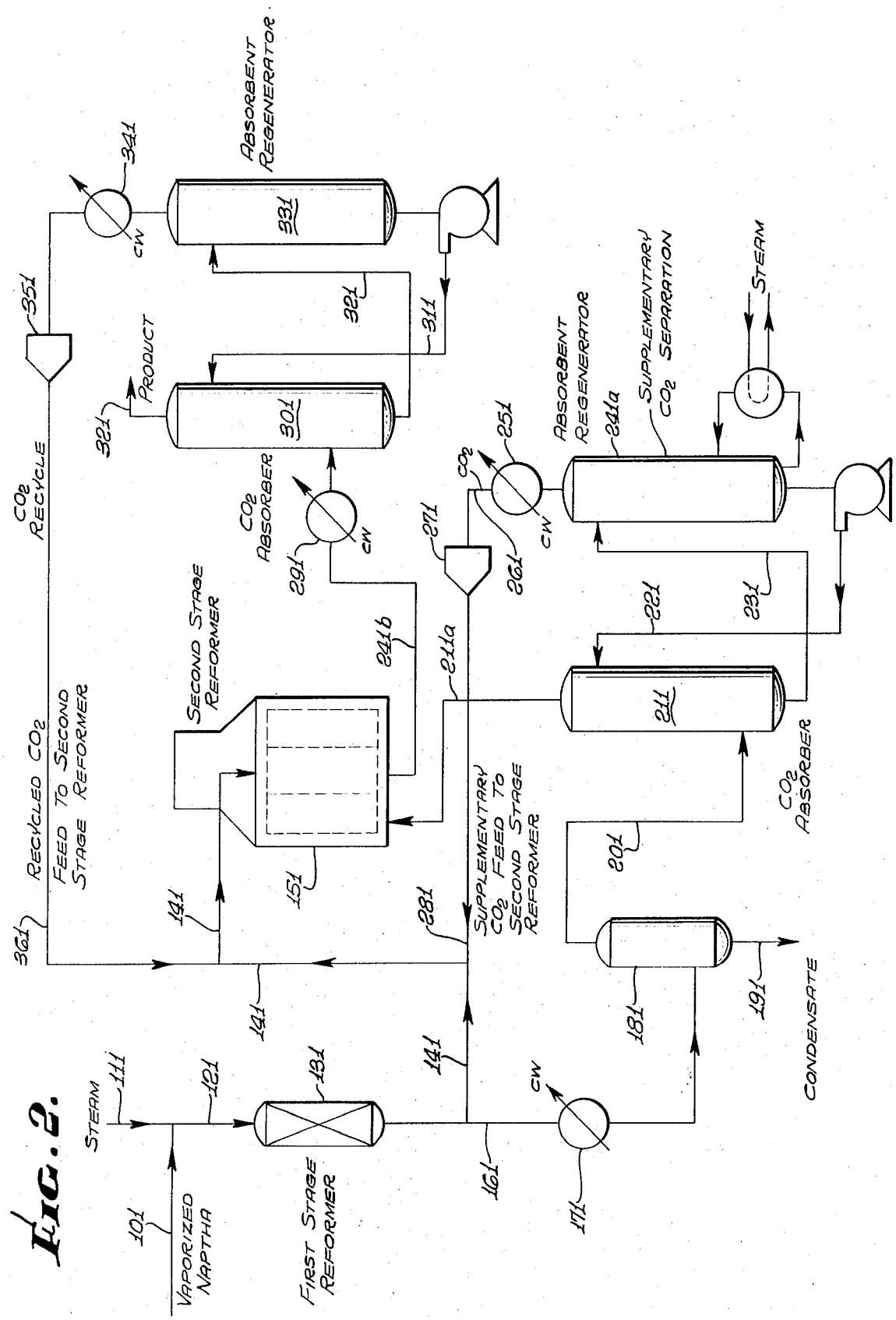

3,859,230

SYNTHESIS GAS GENERATION WITH CARBON DIOXIDE SUPPLEMENTED FEED

REFERENCE TO RELATED APPLICATION

This application is a continuation-in-part of my co-pending application, Ser. No. 869,051, filed Oct. 24, 1969 and now abandoned entitled CARBON DIOXIDE SUPPLEMENTATION OF SYNTHESIS GASES.

BACKGROUND OF THE INVENTION

Synthesis gases for the production of such chemicals as alcohols and aldehydes customarily have been derived from two-stage catalytic reforming of a hydrocarbon, e.g. naphtha, feed stock by passage with steam through a first stage reformer, the effluent from which is subjected to further catalytic conversion in a second stage reforming furnace, the effluent from which constitutes the synthesis gas product, a mixture of carbon dioxide and hydrogen in a ratio desirably relatively high in carbon monoxide content.

Prior Art

The production of synthesis gas having a ratio of carbon monoxide to hydrogen other than the stoichiometric ratio, e.g. a synthesis gas relatively increased in carbon monoxide content requires the addition of carbon dioxide to the feed to the second reforming stage. Added carbon dioxide is usually obtained by absorbing carbon dioxide from the reforming furnace effluent process gases, but these gases are stoichiometrically limited in their carbon dioxide content and thus provide only an insufficient quantity of carbon dioxide; this necessitates obtaining still additional carbon dioxide from some external source, such as by absorbing carbon dioxide from the furnace flue gas, by procedures involving costly compression of the gas.

The prior art has accordingly been limited by reaction stoichiometry to certain, less than most desirable ratios of carbon monoxide in the synthesis gas, or has had to resort to costly compression and processing of flue gases.

SUMMARY OF THE INVENTION

The present invention has for its general object to provide a comparatively simple, direct and more economical process for supplementing with carbon dioxide the second reforming stage feed. The carbon dioxide supplement is obtained according to the invention by the separation and recovery of carbon dioxide from a minor portion of the effluent from the first reforming stage, which carbon dioxide is combined with the major portion of the first reforming stage effluent to provide to the second reforming stage a carbon dioxide supplemented feed. The balance of the minor portion, following carbon dioxide separation, is passed out of the process, to waste, or to use as fuel, e.g. in the second stage reformer furnace.

In accordance with the invention, the first stage reformer effluent is divided and a first and major portion thereof used as direct feed to the second stage reformer. A minor and second divided portion of the effluent is cooled and subjected to carbon dioxide separation by passage successively through carbon dioxide absorption and stripping zones, from which the separated carbon dioxide is added to the first, major portion. The thus supplemented first and major portion is then the second stage reforming furnace feed.

More particularly the invention achieves carbon dioxide supplementation in the method of producing synthesis gas from hydrocarbons that includes, passing naphtha and steam through a first reforming zone to produce an effluent mixture containing methane, steam, hydrogen and carbon dioxide, dividing said effluent mixture into a major portion and a minor portion, passing the major effluent portion to a second reforming zone for conversion to a synthesis gas product comprising hydrogen and carbon monoxide; separating carbon dioxide from the minor effluent portion, and passing the separated carbon dioxide to the second reforming zone to supplement the carbon dioxide content of the effluent major portion, to thereby increase the carbon monoxide content of the synthesis gas product relative to hydrogen.

The major effluent portion may comprise at least 70 volume percent and between 70 and 80 volume percent of the first reforming zone effluent. The minor effluent portion may comprise about 15 to 30 volume percent of the effluent. This minor effluent portion may be passed through cooling and condensate separation zones before carbon dioxide separation. The minor effluent portion further may be cooled and the cooled minor portion passed successively through carbon dioxide absorption and absorbent regeneration zones. The separated carbon dioxide from the minor portion may comprise about 5 to 30 volume percent of the feed to the second reforming zone.

The present method further contemplates treating the synthesis gas product from the second reforming zone to recover residual carbon dioxide therein, and returning the recovered carbon dioxide to the second reforming zone. Accordingly, the method includes cooling the synthesis gas product from the second reforming zone and passing the cooled product successively through carbon dioxide absorption and absorbent regeneration zone.

BRIEF DESCRIPTION OF THE DRAWINGS

All the features and objects of the invention as well as the details of illustrative embodiments will be apparent from the following description of the accompanying drawings, in which:

FIG. 2 is a flow sheet of another embodiment of the invention in which supplementary carbon dioxide is separated, and passed to the second reforming zone separately from recycle carbon dioxide obtained from the synthesis gas product.

DESCRIPTION OF THE PREFERRED EMBODIMENTS

Figure 1:
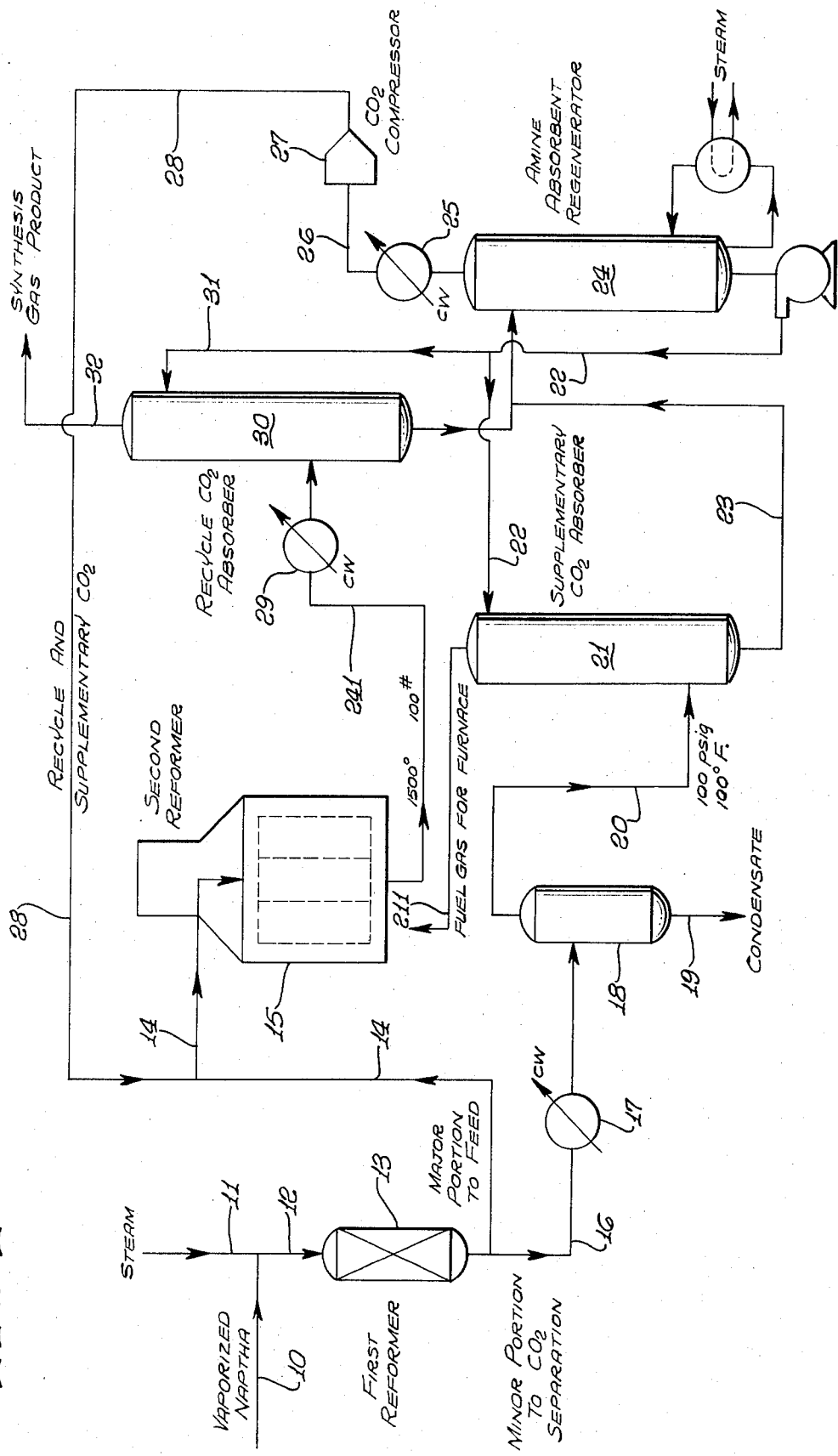
FIG. 1 is a flow sheet of a process embodiment in which the supplementary carbon dioxide is combined with recycled carbon dioxide for common absorbent regeneration and compression following which the carbon dioxide is delivered to the second reforming zone.

In reference to FIG. 1 of the drawings, vaporized naphtha introduced to the system through line 10 is combined with steam from line 11 and fed through line 12 to the naphtha reformer 13. Typically the reformer feed will analyze, by weight percentage, to about 29 percent naphtha and 71 percent steam at a pressure in the range of about 200 to 400 psig and temperature of about 700° to 800°F. The reformer catalyst may be conventional nickel and uranium oxide on a ceramic carrier.

A major portion, e.g. about 70 to 80 percent, of the reformer effluent is taken through line 14 as feed to the second stage or reforming furnace 15. The remainder, 15 percent or 20 to 30 percent, of the reformer effluent is passed through line 16 and cooler 17 into separator 18 from which mainly water condensate is withdrawn through line 19. The separator overhead passes through line 20 into a carbon dioxide absorber 21 of conventional type employing an amine absorbent, e.g. monoethanolmine, introduced to the absorber through line 22 for counterflow contact with the gas feed at about 100 psig and 100°F. The absorber overhead may be taken through line 211 as fuel for the reforming furnace 15.

The rich absorbent is introduced from line 23 into the amine stripper or regenerator column 24 in which the pressure is dropped to near atmospheric pressure to assist stripping, the overhead from column 24 is passed through cooler 25 and line 26 to compressor 27 which repressures the separated carbon dioxide for passage through line 28 and combination in line 24 with the major portion to form the second reforming furnace feed.

Carbon dioxide recycle may also be practiced. For this purpose, the line 241 reforming furnace effluent may be subjected to carbon dioxide separation by passage through cooler 29 into the amine absorber 30 wherein the gas is contacted with a second portion of the lean absorbent from line 31, whereby recycle carbon dioxide absorbent is regenerated in common with supplemental carbon dioxide absorbent, both in column 24.

As illustrative, the line 14 reformer effluent may contain, by volumes, about 27.9 percent methane, 54 percent steam, 10.6 percent carbon dioxide, 7.4 percent hydrogen and the balance carbon monoxide. The carbon dioxide passed to second reformer 15 through line 28 comprising both supplemental carbon dioxide from line 23 (from the minor portion of first stage) ordinarily will constitute about 25 to 35 volume percent of the total reforming furnace feed. In the reforming furnace the feed may be contacted with a conventional reforming nickel-on-ceramic catalyst at about 1500°F and 100 psig pressure.

A typical approximate analysis of the line 241 furnace effluent is about 0.7 percent methane, 25 percent steam, 24.3 percent carbon monoxide, 20.4 percent carbon dioxide and the balance hydrogen, the carbon dioxide from line 28 ranging between about 25 to 35 volume percent of the total second reformer furnace feed.

The synthesis gas is produced as overhead through line 32 from the recycle carbon dioxide absorber 30. As illustrative, for the production of oxo-alcohols the synthesis gas composition may be about 44 percent carbon monoxide, 54 percent hydrogen and the balance inerts, at a temperature of about 100°F and pressure of 100 psig.

The foregoing embodiment employed a common amine absorbent regeneration column 24. In the ensuing embodiment the supplemental carbon dioxide and recycle carbon dioxide are obtained and maintained separate. In reference to FIG. 2 of the drawings, vaporized naphtha introduced to the system through line 101 is combined with steam from line 111 and fed through line 121 to the naphtha reformer 131. Typically, and as in the preceding embodiment, the reformer feed will analyze, by weight percentage, to about 29 percent naphtha and 71 percent steam at a pressure in the range of about 200 to 400 psig and temperature of about 700° to 800°F. The reformer catalyst may be conventional nickel and uranium oxide on a ceramic carrier.

A major portion, e.g. about 70 to 80 percent, of the reformer effluent is taken through line 141 as feed to the second stage or reforming furnace 151. The remainder, 20 to 30 percent, of the reformer effluent is passed through line 16 and cooler 171 into separator 181 from which mainly water condensate is withdrawn through line 191. The separator overhead passes through line 201 into a carbon dioxide absorber 211 of conventional type employing an amine absorbent, e.g. monoethanolamine, introduced to the absorber through line 221 for counterflow contact with the gas feed at about 100 psig and 100°F. The absorber overhead may be taken through line 211a as fuel for the reforming furnace 151.

The rich absorbent is introduced from line 231 into the amine stripper or regenerator column 241a, the overhead from which is passed through cooler 251 and line 261 to compressor 271 which passes the separated carbon dioxide through line 281 to be combined with the line 141 reforming furnace feed.

The line 241b reforming furnace effluent may also be subjected to carbon dioxide separation by passage through cooler 291 into the amine feed absorber 301 wherein the gas is contacted with lean absorbent from line 311. Rich absorbent in line 321 is introduced into an amine stripper or regenerator column 331, lean absorbent is passed into line 311. Overhead from column 331 is passed through cooler 341 and compressor 351 in line 361.

As illustrative, the line 141 first reformer stage effluent may contain, by volume, about 27.9 percent methane, 54 percent steam, 10.6 percent carbon dioxide, 7.4 percent hydrogen and the balance carbon monoxide. The supplementary carbon dioxide through line 281 ordinarily will constitute about 5 to 30 volume percent of the total second stage reforming furnace feed. The recycle carbon dioxide through line 361 ordinarily then will constitute about 5 to 20 volume percent of the total second stage reforming furnace feed. In the second reforming furnace the feed may be contacted with a conventional reforming nickel-on-ceramic catalyst at about 1500°F and 100 psig pressure.

A typical approximate analysis of the line 241 second stage reformer furnace effluent is about 0.7 percent methane, 25 percent steam, 24.3 percent carbon monoside, 20.4 percent carbon dioxide and the balance hydrogen, the supplementary carbon dioxide and recycle carbon dioxide from lines 281 and 361 respectively ranging between about 25 and 35 volume percent of the total second reformer furance feed.

The synthesis gas is produced as overhead through line 321 from the carbon dioxide absorber 301. As illustrative, for the production of oxo-alcohols the synthesis gas composition may be about 44 percent carbon monoxide, 54 percent hydrogen and the balance inerts, at a temperature of about 100°F and pressure of 100 psig.

I claim:

1. In a process for the production of synthesis gas comprising a first reforming stage fed with naptha feedstock and steam to produce a gaseous mixture effluent comprising hydrogen, carbon monoxide, carbon dioxide, methane, and steam and a second reforming stage fed by first stage effluent; the improvement which consists of dividing said first stage effluent into major and minor portions, the minor portion being about 15 to 30 volume percent of the total effluent, separating carbon dioxide from said minor portion, combining the separated carbon dioxide with said major effluent portion and passing the resulting combined stream as feed to the second reforming stage thereby increasing the carbon monoxide content relative to hydrogen in the synthesis gas product.

* * * * *